US009280861B2

(12) United States Patent
Kotani

(10) Patent No.: US 9,280,861 B2
(45) Date of Patent: *Mar. 8, 2016

(54) PAPER-SHEET HANDLING APPARATUS AND PAPER-SHEET HANDLING METHOD

(71) Applicant: GLORY LTD., Himeji-Shi, Hyogo-Ken (JP)

(72) Inventor: Kaname Kotani, Hyogo-Ken (JP)

(73) Assignee: GLORY LTD., Himeji-Shi, Hyogo-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,667

(22) Filed: Dec. 22, 2014

(65) Prior Publication Data

US 2015/0110353 A1 Apr. 23, 2015

Related U.S. Application Data

(63) Continuation of application No. 13/392,945, filed as application No. PCT/JP2009/065175 on Aug. 31, 2009, now Pat. No. 8,923,557.

(51) Int. Cl.

| | |
|---|---|
| ***G06K 9/00*** | (2006.01) |
| ***G07D 11/00*** | (2006.01) |
| *G06F 7/00* | (2006.01) |

(52) U.S. Cl.

CPC ........ *G07D 11/0084* (2013.01); *G07D 11/0066* (2013.01)

(58) Field of Classification Search

USPC ......... 382/100, 103, 112–115, 135–139, 155, 382/162, 168, 173, 181–189, 199, 209, 219, 382/232, 254, 274, 285, 287, 305, 312, 321, 382/175; 700/224, 226, 244; 377/94; 235/379

See application file for complete search history.

(56) References Cited

U.S. PATENT DOCUMENTS

| | | | | | |
|---|---|---|---|---|---|
| 4,166,945 | A * | 9/1979 | Inoyama | G06Q 40/02 | 235/379 |
| 7,016,767 | B2 * | 3/2006 | Jones | G07D 11/0084 | 700/224 |
| 8,041,098 | B2 * | 10/2011 | Jones | G06Q 20/042 | 382/137 |
| 2005/0053183 | A1 * | 3/2005 | Abe | B65H 5/062 | 377/94 |
| 2005/0060061 | A1 * | 3/2005 | Jones | G07D 11/0084 | 700/226 |

* cited by examiner

*Primary Examiner* — Seyed Azarian

(74) *Attorney, Agent, or Firm* — Renner, Kenner, Greive, Bobak, Taylor & Weber

(57) ABSTRACT

A paper-sheet handling apparatus (10) includes: a recognition unit (14) configured to obtain recognition information of a paper sheet by recognizing the paper sheet, and to obtain an image of the paper sheet so as to obtain paper-sheet information from the acquired image of the paper sheet; a reject unit (18) to which a paper sheet, which is other than a paper sheet that has been recognized as a normal paper sheet by the recognition unit (14), is sent; and a control unit (30) configured to output display information about the paper-sheet information of each paper sheet sent to the reject unit (18). The display information output by the control unit (30) is displayed on a display unit (22) disposed on the paper-sheet handling apparatus (10), or transmitted to an external apparatus (40), which is other than the paper-sheet handling apparatus (10), through an interface unit (39) so as to be displayed on a display unit disposed on the external apparatus (40).

5 Claims, 2 Drawing Sheets

PAPER-SHEET HANDLING APPARATUS AND PAPER-SHEET HANDLING METHOD

CROSS-REFERENCE TO RELATED APPLICATION

This application is a continuation of U.S. patent application Ser. No. 13/392,945 filed on Feb. 28, 2012, which was based upon and claimed the benefit of priority from the prior PCT/JP2009/065175 filed on Aug. 31, 2009, the entire contents of which are incorporated herein by reference.

FIELD OF THE INVENTION

The present invention relates to a paper-sheet handling apparatus and a paper-sheet handling method for handling paper sheets such as banknotes, checks, documents and so on.

BACKGROUND OF THE INVENTION

There has been conventionally known a paper-sheet handling apparatus that recognizes paper sheets such as banknotes, checks, documents and so on, sends, based on paper-sheet recognition information, a paper sheet, which has been recognized as a normal paper sheet, to a stacking unit, and sends a paper sheet, which is other than a paper sheet that has been recognized as a normal paper sheet, to a reject unit. As such a paper-sheet handling apparatus, apparatuses disclosed in Patent Documents 1 and 2, for example, are known.

Patent Document 1 discloses a banknote depositing and dispensing machine for use in a bank or the like. In the banknote depositing and dispensing machine disclosed in Patent Document 1, a deposited banknote deposited from outside through an inlet is recognized by a recognition unit, and a banknote, which has been recognized as a normal banknote, is stored in a collective cassette. Thereafter, the banknote in the collective cassette is fed out and recognized, and is stored in a cassette by denomination. Then, the banknote is fed out from the cassette by denomination and recognized, so that an amount-of-money data of the cassette by denomination is determined.

Patent Document 2 discloses a banknote counting machine for counting a banknote, which is capable of performing a batch process over a plurality of transactions. In the banknote counting machine disclosed in Patent Document 2, the batch number is set, a banknote placed on a hopper is fed out to an inside of a housing and recognized, and, for each time a banknote of a designated denomination is transported to a stacker, the count number of the banknotes of the designated denomination is stored. Then, when the count number of the banknotes of the designated denomination becomes equal to the batch number, the feeding out from the hopper is stopped. In addition, when a banknote is taken out from the stacker, the count number is cleared.

Patent Document 1: JP10-91846A

Patent Document 2: JP9-106465A

DISCLOSURE OF THE INVENTION

In the banknote depositing and dispensing machine disclosed in Patent Document 1, a deposited banknote deposited from outside through the inlet is recognized, and a banknote, which has been recognized to be not normal, is transported to a reject unit. In the banknote counting machine disclosed in Patent Document 2, a banknote placed on the hopper is fed out to the inside of the housing and recognized, and a genuine note of a denomination other than the designated denomination, a counterfeit note and so on are transported to a reject unit. In the apparatuses shown in Patent Documents 1 and 2, a banknote to be transported to the reject unit may be a counterfeit note, a suspect note (a suspicious note about authenticity), or an abnormally transported genuine note transported in an improper state such as a skewed state, an overlapped state, a chained state and so on. However, since banknotes of these plural types are stacked in the reject unit in a mixed state, there is a problem in that an operator cannot easily sort a counterfeit note, a suspect note, an abnormally transported genuine note and so on.

In Europe, when a counterfeit note or a suspect note is found, such a counterfeit note or suspect note must be collected, without being circulated. Thus, when a counterfeit note or a suspect note is included in banknotes stacked in the reject unit, it is necessary for the operator to take out the counterfeit note and the suspect note. However, since banknotes of plural types are stacked in the reject unit in a mixed state, it is not easy for the operator to pick up the counterfeit note or the suspect note.

The present invention has been made in view of the above circumstances. The object of the present invention is to provide a paper-sheet handling apparatus and a paper-sheet handling method allowing an operator to observe paper-sheet information (e.g., a serial number and so on of a banknote) of each paper sheet sent to the reject unit, whereby it is possible to easily sort paper sheets of plural types mixed in a reject unit, specifically, to sort a genuine note (a genuine note that has been sent to the reject unit by abnormal transport) from a counterfeit note and a suspect note, which are banknotes of plural types mixed in the reject unit.

A paper-sheet handling apparatus of the present invention is a paper-sheet handling apparatus including: a recognition unit configured to obtain recognition information of a paper sheet by recognizing the paper sheet, and to acquire an image of the paper sheet so as to obtain paper-sheet information from the acquired image of the paper sheet; a stacking unit to which a paper sheet is sent, the paper sheet having been recognized as a normal paper sheet by the recognition unit; a reject unit to which a paper sheet is sent, the paper sheet being other than the paper sheet that has been recognized as a normal paper sheet by the recognition unit; and a control unit configured to output display information about the paper-sheet information of each paper sheet sent to the reject unit.

According to the paper-sheet handling apparatus, since the operator can observe, as to a plurality of paper sheets which have been sent to the reject unit, the paper-sheet information of each paper sheet (e.g., a serial number of a banknote or a serial number of a check), it is easy to sort, for each kind, the paper sheets mixed in the reject unit. For example, when a banknote is used as the paper sheet, the operator can observe, as to banknotes of plural types which have been sent to the reject unit, a serial number of each banknote. Thus, it is easy to sort a genuine note (a genuine note that has been sent to the reject unit by abnormal transport) from a counterfeit note and a suspect note, which are mixed in the reject unit. Therefore, the operator can more rapidly and easily put the genuine note, which has been sent to the reject unit, into an inlet unit, whereby the genuine note can be handled again by the banknote handling apparatus. On the other hand, as to a counterfeit note or a suspect note which has been sent to the reject unit, the counterfeit note or the suspect note can be easily identified by observing the serial number of each banknote.

In the paper-sheet handling apparatus of the present invention may further include a display unit configured to display the display information output by the control unit.

Alternatively, the paper-sheet handling apparatus of the present invention may further include an interface unit configured to transmit the display information output from the control unit to an external apparatus which is other than the paper-sheet handling apparatus, the external apparatus including a display unit for displaying the display information.

In the paper-sheet handling apparatus of the present invention, the control unit may be configured to further output, as to each paper sheet sent to the reject unit, display information about the recognition information by the recognition unit.

In the paper-sheet handling apparatus of the present invention, the control unit may be provided with a display-order setting unit configured to set a display order relative to display of the display information about the paper-sheet information of each paper sheet sent to the reject unit, and the display-order setting unit may be configured to set the display order on the display information so as to set an order in which the paper sheets have been sent and stacked in the reject unit, or another order reverse to the order.

In the paper-sheet handling apparatus of the present invention, the control unit may be provided with a display-color setting unit configured to set a display color relative to the display information about the paper-sheet information of each paper sheet sent to the reject unit, and the display-color setting unit may be configured to set the display color on the display information for each paper-sheet information, based on the recognition information by the recognition unit.

In the paper-sheet handling apparatus of the present invention, the control unit may be provided with a display-or-not-display setting unit configured to set, as to the display information about the paper-sheet information of each paper sheet sent to the reject unit, a type of paper-sheet information of the paper sheet to be displayed, out of the types of respective paper sheets sent to the reject unit, and the display-or-not-display setting unit may be configured to set paper-sheet information of the paper sheet to be displayed, out of the respective paper sheets sent to the reject unit, based on the recognition information by the recognition unit.

At this time, the control unit may be configured to detect, as to the respective paper sheets sent to the reject unit, the number of paper sheets of each type, and the display-or-not-display unit may be configured to automatically set paper-sheet information of the paper sheet to be displayed, out of the various types of paper sheets sent to the reject unit, based on the number of paper sheets for each type which has been detected by the control unit.

In the paper-sheet handling apparatus of the present invention, the paper sheet may be a banknote, and the paper-sheet information may be a serial number of the banknote.

Alternatively, the paper sheet may be a check, and the paper-sheet information may be at least one of a bank code, an account number, a serial number, a paid sum, a sign, and endorsement information.

Alternatively, the paper sheet may be a document, and the paper-sheet information may be at least one of an item, the number, a unit price, and a total sum.

A paper-sheet handling method of the present invention is a paper-sheet handling method for handling a paper sheet by a paper-sheet handling apparatus, the paper-sheet handling method including: obtaining recognition information of a paper sheet by recognizing the paper sheet, and acquiring an image of the paper sheet so as to obtain paper-sheet information based on the acquired image of the paper sheet; sending a paper sheet to a stacking unit, the paper sheet having been recognized as a normal paper sheet based on the obtained recognition information of the paper sheet; sending a paper sheet to a reject unit, the paper sheet being recognized as a normal banknote based on the obtained recognition information of the paper sheet; and outputting display information about the paper-sheet information of each paper sheet sent to the reject unit.

In the paper-sheet handling method of the present invention may further include displaying the output display information on a display unit disposed on the paper-sheet handling apparatus.

Alternatively, the paper-sheet handling method of the present invention may further include transmitting the output display information to an external apparatus that is other than the paper-sheet handling apparatus, the external apparatus including a display unit for displaying the display information.

DETAILED DESCRIPTION OF THE INVENTION

Figure 1:
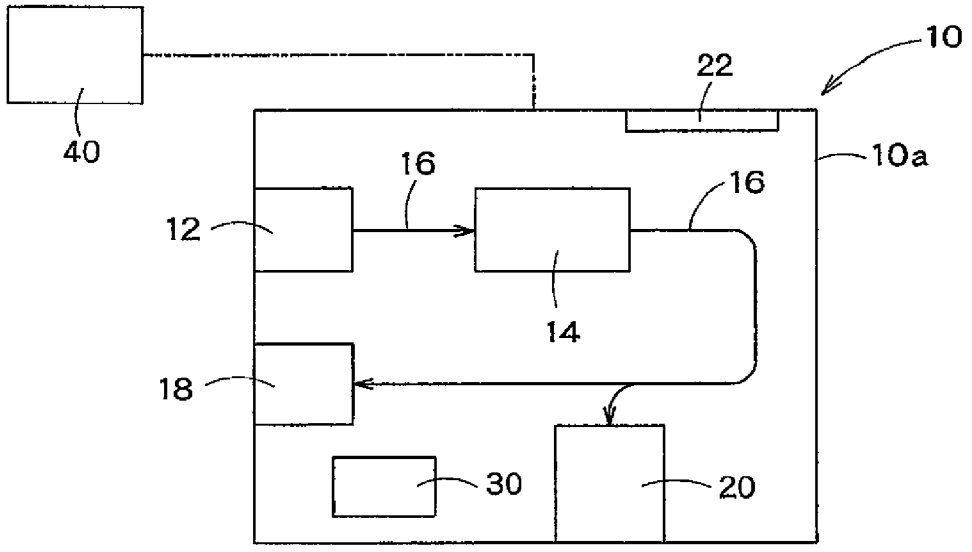
FIG. 1 is a schematic structural view schematically showing a structure of a banknote handling apparatus in one embodiment of the present invention.
Figure 2:
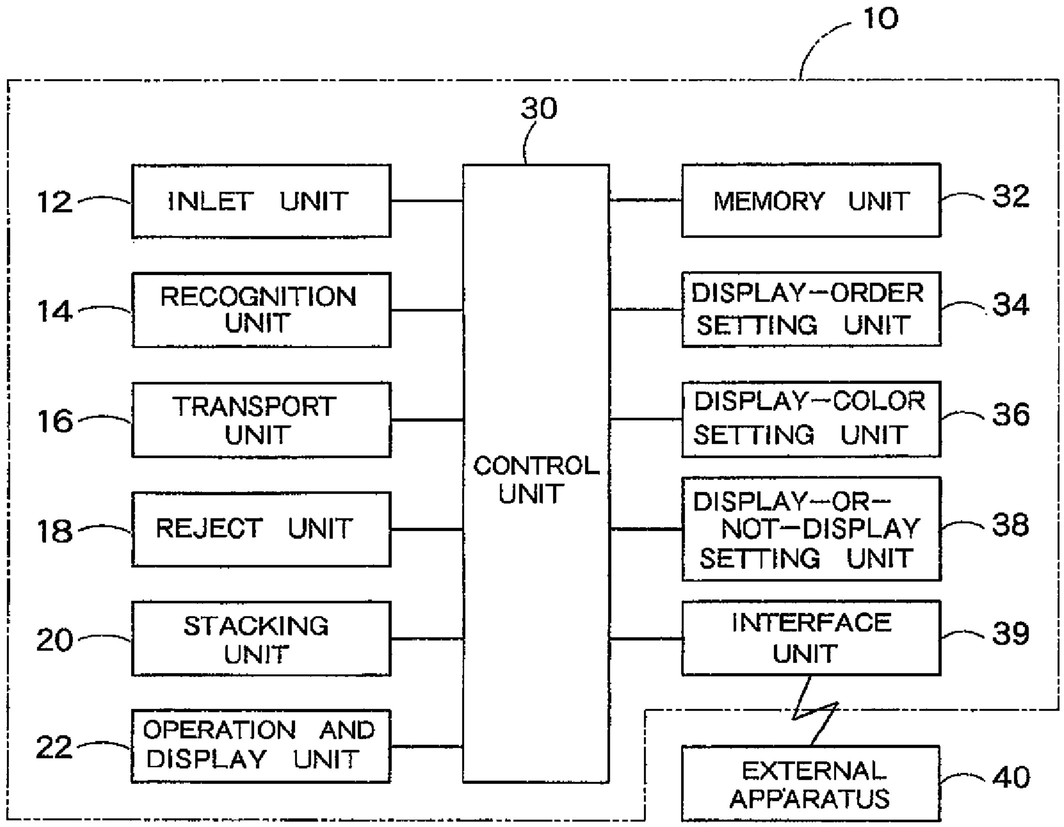
FIG. 2 is a control block diagram of the banknote handling apparatus shown in FIG. 1.
Figure 3:
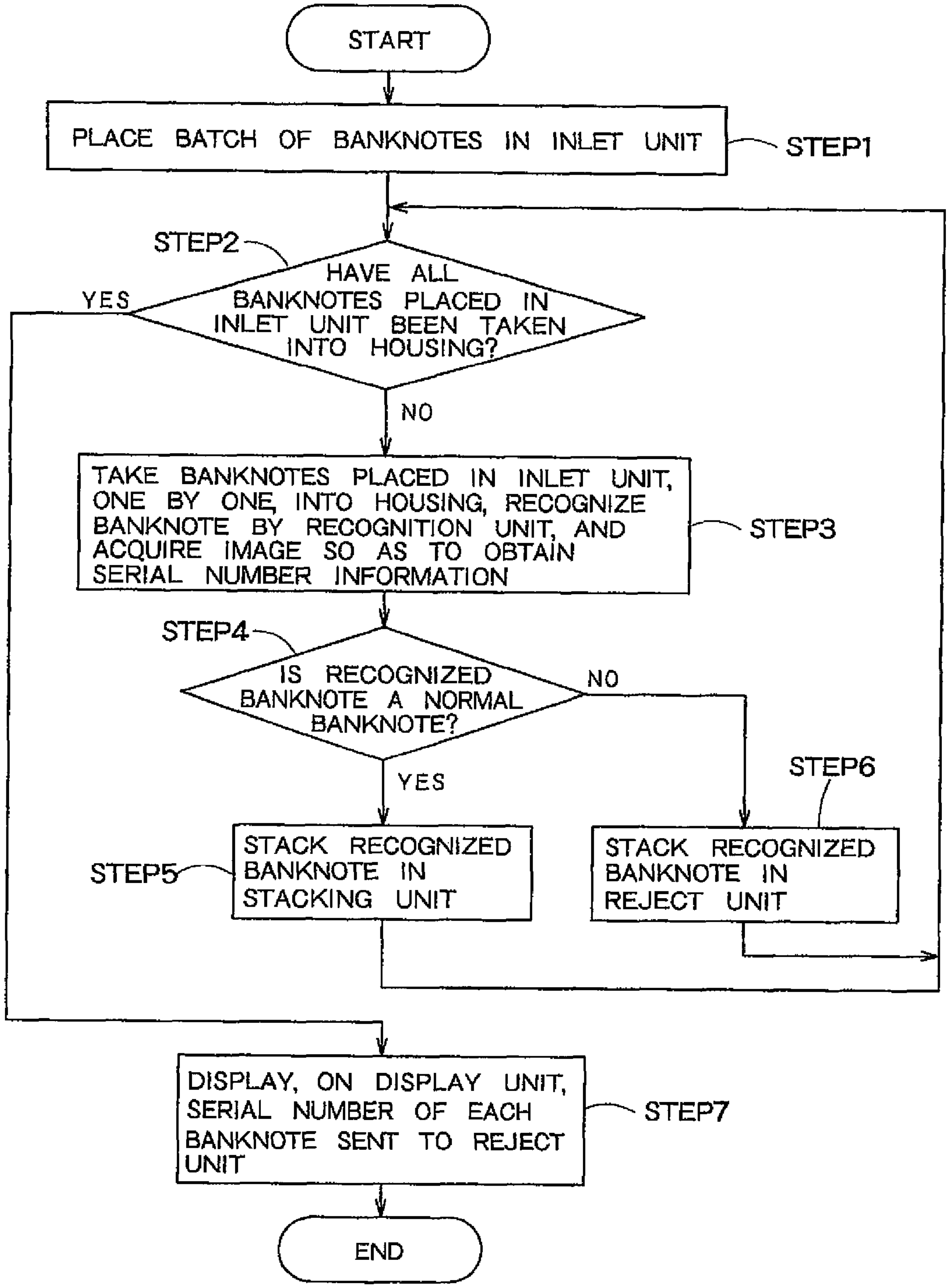
FIG. 3 is a flowchart showing a banknote handling operation of the banknote handling apparatus shown in FIGS. 1 and 2.

An embodiment of the present invention will be described with reference to the drawings. In the embodiment shown below, there is described an example in which a banknote handling apparatus for handling a banknote is applied as the paper-sheet handling apparatus of the present invention. FIGS. 1 to 3 are views showing the banknote handling apparatus in this embodiment. In more detail, FIG. 1 is a schematic structural view schematically showing a structure of the banknote handling apparatus in this embodiment. FIG. 2 is a control block diagram of the banknote handling apparatus shown in FIG. 1. FIG. 3 is a flowchart showing a banknote handling operation of the banknote handling apparatus shown in FIGS. 1 and 2.

As shown in FIG. 1, the banknote handling apparatus 10 in this embodiment includes: an inlet unit 12 configured to put a banknote, one by one, into a housing 10*a* of the banknote handling apparatus 10; a transport unit 16 configured to transport, one by one, the banknote, which has been put into the housing 10*a* through the inlet unit 12; and a recognition unit 14 disposed on the transport unit 16, the recognition unit 14 being configured to recognize the banknote transported by the transport unit 16. The transport unit 16 is diverged on a downstream side of the recognition unit 14. A reject unit 18 and a stacking unit 20 are connected to two diverged portions of the transport unit 16. Thus, a banknote, which has been recognized by the recognition unit 14, is sent to any one of the reject unit 18 and the stacking unit 20, by the transport unit 16. An operation and display unit 22 is disposed on the housing 10*a* of the banknote handling apparatus 10. The operation and display unit 22 is used by an operator to operate the banknote handling apparatus 10, and to display a handling condition of the banknote handling apparatus 10. An external apparatus 40, which is a higher-level apparatus such as a terminal or a host computer or the like, is connected, for communication, to the banknote handling apparatus 10.

Herebelow, the respective constituent elements of the banknote handling apparatus 10 are described in detail.

The inlet unit 12 is configured to allow an operator to place therein a batch of banknotes from outside. The banknotes put into the inlet unit 12 by the operator are fed out, one by one, to the inside of the housing 10*a* by a feeding-out mechanism (not shown) disposed on the inlet unit 12.

The banknote sent to the inside of the housing 10*a* by the inlet unit 12 is transported, one by one, by the transport unit 16, in the housing 10*a*. At this time, a denomination, an authenticity, a fitness and so on of the banknote are recognized by the recognition unit 14. In addition, the recognition unit 14 is configured to acquire an image of at least one surface (a surface on one side or surfaces on both sides) of the banknote, by a scanner (not shown) disposed on the recognition unit 14. The recognition unit 14 is configured to obtain serial-number information from the acquired banknote image. The recognition unit 14 may recognize a denomination, an authenticity, a fitness and so on of the banknote based on the acquired banknote image, and obtain serial-number information from this image.

The banknote, which has been recognized by the recognition unit 14, is further transported by the transport unit 16. At this time, a banknote, which has been recognized as a normal banknote by the recognition unit 14, is sent to the stacking unit 20. On the other hand, a banknote, which is other than a banknote that has been recognized as a normal banknote by the recognition unit 14, is sent to the reject unit 18. To be specific, a banknote, which has been recognized by the recognition unit 14 as a counterfeit note or a suspect note (a suspicious note about authenticity), is sent to the reject unit 18. In addition, even in a case where a banknote is a genuine banknote, when the banknote is an unfit note (a folded note), or when there is detected an abnormal transport in which the banknote is transported in an improper state such as a skewed state, an overlapped state, a chained state and so on, the unfit note or the abnormally transported genuine note is sent to the reject unit 18.

The reject unit 18 is configured to stack a banknote sent from the transport unit 16. An operator can access the reject unit 18 from outside the housing 10*a*. Thus, the operator can take out a batch of banknotes stacked in the reject unit 18.

The stacking unit 20 is configured to stack a banknote sent from the transport unit 16. Although FIG. 1 shows the only one stacking unit 20, a plurality of stacking units 20 may be provided for each denomination. In this case, banknotes may be stacked by denomination, in the respective stacking units 20, based on denominations of the banknotes which have been recognized by the recognition unit 14.

The operation and display unit 22 is formed of, e.g., a touch panel. When an operator presses down various keys displayed on the operation and display unit 22, various commands can be transmitted to a control unit 30 which will be described below. In addition, the operation and display unit 20 is configured to display a handling condition of the banknote handling apparatus 10, specifically, the number of banknotes for each denomination, which are stacked in the stacking unit 20, for example.

The banknote handling apparatus 10 is provided with the control unit 30 configured to control the respective constituent elements of the banknote handling apparatus 10. The control unit 30 is located inside the housing 10*a* of the banknote handling apparatus 10. Herebelow, a structure of the control unit 30 is described in detail with reference to FIG. 2.

As shown in FIG. 2, connected to the control unit 30 are the respective constituent elements of the banknote handling apparatus 10, specifically, the inlet unit 12, the recognition unit 14, the transport unit 16, the reject unit 18, the stacking unit 20 and the operation and display unit 22. Transmitted to the control unit 30 are information about a banknote recognition result (e.g., at least one of an authenticity, a fitness and a transport state (a skewed state, a chained state, an overlapped state and so on)) and serial-number information of a banknote. In addition, a command by an operator is transmitted to the control unit 30 from the operation and display unit 22. In addition, the control unit 30 is configured to control the respective inlet unit 12, the transport unit 16, the reject unit 18, the stacking unit 20 and the operation and display unit 22, of the banknote handling apparatus 10. The control unit 30 is configured to output display information (described below) to the operation and display unit 22, and the operation and display unit 22 is configured to display the display information transmitted from the control unit 30.

A memory unit 32 is connected to the control unit 30. The memory unit 32 is configured to store information about a banknote handling result by the banknote handling apparatus 10. To be specific, information about a banknote recognition result, an image of the banknote, serial-number information of the banknote and so on, which are obtained by the recognition unit 14, are stored in the memory unit 32 for each banknote.

An interface unit 39 is connected to the control unit 30. The control unit 30 can transmit and receive a signal to and from the external apparatus 40 through the interface unit 39. Out of the information stored in the memory unit 32, data required for succeeding confirmation and search may be transmitted to the external apparatus 40 and so on, through the interface unit 39.

In addition, connected to the control unit 30 are a display-order setting unit 34, a display-color setting unit 36, and a display-or-not-display setting unit 38. Details of these setting units 34, 36 and 38 will be described hereafter.

The external apparatus 40 previously stores serial numbers of a counterfeit note, a suspect note and a stolen banknote. Alternatively, the serial numbers of the counterfeit note, the suspect note and the stole banknote may be stored, not in the external apparatus 40, but in the memory unit 32 of the banknote handling apparatus 10.

Next, an operation (banknote handling method) of the banknote handling apparatus 10 as structured above is described with reference to the flowchart shown in FIG. 3. The below-described operation of the banknote handling apparatus 10 is performed by the control unit 30 controlling the respective constituent elements of the banknote handling apparatus 10.

At first, an operator places a batch of banknotes in the inlet unit 12 of the banknote handling apparatus 10 (see STEP 1 of FIG. 3). At this time, the batch of banknotes in a denomination mixed state may be put into the inlet unit 12.

Then, the control unit 30 judges whether or not all the banknotes put into the inlet unit 12 are taken into the housing 10*a* so that the inlet unit 12 is vacant (see STEP 2 of FIG. 3). When a banknote remains in the inlet unit 12 (see "NO" in STEP 2 of FIG. 3), the banknote left in the inlet unit 12 is taken, one by one, into the housing 10*a*, by the feeding-out mechanism (not shown) disposed on the inlet unit 12. The banknote taken into the housing 10*a* is transported by the transport unit 16, and a denomination, an authenticity, fitness and so on of the banknote are recognized by the recognition unit 14. At this time, an image of the banknote is acquired by the scanner (not shown) disposed on the recognition unit 14, and serial-number information is obtained from the image of the banknote (see STEP 3 of FIG. 3). The banknote image, the recognition information (denomination, authenticity, fitness and so on) and the banknote serial-number information are transmitted to the control unit 30, and are stored in the memory unit 32 for each banknote.

Based on the banknote recognition information by the recognition unit 14, the control unit 30 judges whether the recognized banknote is a normal banknote or not (see STEP 4 of FIG. 3). When the recognized banknote is judged as a normal banknote, the banknote is sent to the stacking unit 20 so as to be stacked in the stacking unit 20 (see STEP 5 of FIG. 3). On the other hand, when the recognized banknote is judged not as a normal banknote, specifically, when the banknote is a counterfeit note, a suspect note or an unfit note or when an abnormal transport in which the banknote is transported in an improper state is detected, the banknote is sent to the reject unit 18 so as to be stacked in the reject unit 18 (see STEP 6 of FIG. 3). The aforementioned operation is repeatedly performed, until there remains no banknote in the inlet unit 12, i.e., all the banknotes placed in the inlet unit 12 are taken into the housing 10*a*.

After all the banknotes put into the inlet unit 12 have been taken into the hosing 10*a* (see "YES" in STEP 2 of FIG. 3), the operation and display unit 22 displays a message informing this. At this time, the operation and display unit 22 displays a serial number of each banknote which has been sent to the reject unit 18 (see STEP 7 of FIG. 3). More specifically, display information about the serial number of each banknote sent to the reject unit 18 is output from the control unit 30, and is transmitted to the operation and display unit 22. Then, the operation and display unit 22 displays the display information output from the control unit 30. At this time, the operation and display unit 22 may display serial numbers, one by one, in a switching manner, or may display a list of the serial numbers of the plurality of banknotes. In addition, in the banknote handling apparatus 10 in this embodiment, in addition to the serial number of each banknote sent to the reject unit 18, the banknote image and the recognition information (e.g., denomination, authenticity, fitness and so on of the banknote) by the recognition unit 14 may be displayed on the operation and display unit 22.

At this time, the serial-number information of each banknote sent to the reject unit 18 may be transmitted from the control unit 30 to the external apparatus 40 through the interface unit 39. The external apparatus 40 compares the serial numbers of the counterfeit note, the suspect note and the stolen banknote, which are stored in the external apparatus 40, with the serial number of each banknote sent from the control unit 30, When the serial numbers coincide with each other, the external apparatus 40 transmits this information to the control unit 30. Then, when the operation and display unit 22 displays the serial number of each banknote sent to the reject unit 18, the operation and display unit 22 displays, as to the serial number coincident with that of the counterfeit note, the suspect note or the stole note, which are stored in the external apparatus 40, the message in which banknote having this serial number is the counterfeit note, the suspect note or the stolen note. When the serial number of the counterfeit note or the suspect note is stored, not in the external apparatus 40, but in the memory unit 32 of the banknote handling apparatus 10, the control unit 30 compares the serial number of each banknote sent to the reject unit 18, with the serial number of the counterfeit note or the suspect note which are stored in the memory unit 32.

Thereafter, the operator takes out a batch of banknotes from the reject unit 18, and picks up only a genuine note from the batch of banknotes. Then, the picked-up banknote is again put into the inlet unit 12, and the genuine note is fed out to the inside of the housing 10*a*. In this manner, an unfit note and an abnormally transported genuine note, which have been transported to the reject unit 18, are handled again by the banknote handling apparatus 10.

A display order relative to the serial numbers of the respective banknotes sent to the reject unit 18, which are to be displayed on the operation and display unit 22, can be set by the display-order setting unit 34. To be more specific, when the reject unit 18 has a structure in which banknotes sent from the transport unit 16 are stacked from below, the display-order setting unit 34 sets an order of the serial numbers to be displayed, such that the serial numbers of the banknotes are displayed on the operation and display unit 22 in an order reverse to the order in which the banknotes have been sent and stacked in the reject unit 18. This is because, when the operator has taken out the batch of banknotes from the reject unit 18, the higher up in the batch the banknote is, the later it was put into the housing 10*a* and recognized by the recognition unit 14, relative to the other banknotes. Namely, the uppermost banknote in the batch of banknotes taken out from the reject unit 18 is a banknote that was recognized last by the recognition unit 14, and the lowermost banknote is a banknote that was recognized first by the recognition unit 14. Thus, it is necessary for the operation and display unit 22 to display the serial numbers of the banknotes in the order reverse to the order in which the banknotes have been sent and stacked in the reject unit 18.

On the other hand, when the reject unit 18 has a structure in which banknotes sent from the transport unit 16 are horizontally arranged in a standing state, the display-order setting unit 34 sets an order of the serial numbers to be displayed, such that the serial numbers of the banknotes are displayed on the operation and display unit 22 in the order in which the banknotes have been sent and stacked in the reject unit 18. This is because, when the operator has taken out the batch of banknotes from the reject unit 18, the further forward in the batch the banknote is, the earlier it was put into the housing 10*a* and recognized by the recognition unit 14, relative to the other banknotes. Namely, the forwardmost banknote in the batch of banknotes taken out from the reject unit 18 is a banknote that was recognized first by the recognition unit 14, and the rearmost banknote is a banknote that was recognized last by the recognition unit 14. Thus, the serial numbers of the banknotes are displayed on the operation and display unit 22, in the order in which the banknotes have been sent and stacked in the reject unit 18.

When the banknote handling apparatus 10 is installed, an agent who installs the banknote handling apparatus 10 sets a display order relative to serial numbers of respective banknotes sent to the reject unit 18 by the display-order setting unit 34, based on the structure of the reject unit 18. In addition, setting of the display order by the display-order setting unit 34 can be suitably done by an operator through the operation and display unit 22.

In addition, as to the serial numbers of the respective banknotes sent to the reject unit 18, which are to be displayed on the operation and display unit 22, a display color can be set by the display-color setting unit 36. To be more specific, based on the banknote recognition information by the recognition unit 14, the display-color setting unit 36 is configured to set, for each banknote, display colors of the serial numbers of the respective banknotes. In more detail, the display-color setting unit 36 sets display colors such that the counterfeit note, the suspect note, the unfit note and the abnormally transported genuine note, which have been sent to the reject unit 18, are displayed in different colors (for example, the counterfeit note is displayed in a red color, the suspect note is displayed in a blue color, the unfit note is displayed in a green color and the abnormally transported genuine note is displayed in a yellow color).

An agent who installs the banknote handling apparatus 10 sets display colors of the serial numbers of the respective banknotes sent to the reject unit 18 by the display-color setting unit 36. In addition, setting of the display colors by the display-color setting unit 36 can be suitably done by an operator through the operation and display unit 22.

In addition, as to the display information about the serial numbers of the respective banknotes sent to the reject unit 18, a type of serial number of the banknote to be displayed, out of the various types of banknotes of sent to the reject unit 18, can be set by the display-or-not-display setting unit 38. Based on the banknote recognition information by the recognition unit 14, the display-or-not-display setting unit 38 is configured to set which serial number of the banknote is displayed, out of the respective banknotes sent to the reject unit 18. To be more specific, for example, the display-or-not-display setting unit 38 is configured to set the display operation such that, out of the counterfeit note, the suspect note, the unfit note and the abnormally transported genuine note which have been sent to the reject unit 18, the serial numbers of the counterfeit note and the suspect note are displayed on the operation and display unit 22, and that the serial numbers of the unfit note and the abnormally transported genuine note are not displayed on the operation and display unit 22. Thus, in Europe where a counterfeit note and a suspect note must be collected, for example, since the serial numbers of the counterfeit note and the suspect note displayed on the operation and display unit 22 can be confirmed, an operator can rapidly and reliably pick up the counterfeit note and the suspect note from the batch of banknotes taken out from the reject unit 18.

An agent who installs the banknote handling apparatus 10 sets display or not display of the serial numbers of the respective banknotes sent to the reject unit 18, for each type of the banknotes, by the display-or-not-display setting unit 38. In addition, setting of display or not display of banknotes for each type can be suitably done by an operator through the operation and display unit 22.

When the control unit 30 detects, as to the respective banknotes sent to the reject unit 18, the number of banknotes for each type (e.g., counterfeit note, suspect note, unfit note and abnormally transported genuine note), the display-or-not-display setting unit 38 may automatically set which serial number of the banknote is to be displayed, out of the banknotes of various types sent to the reject unit 18, based on the number of banknotes for each type which has been detected by the control unit 30. To be more specific, when the control unit 30 compares the number of abnormally transported genuine notes sent to the reject unit 18 with a sum of the number of counterfeit notes and the number of suspect notes sent to the reject unit 18, and the number of abnormally transported genuine notes is smaller than the sum of the number of counterfeit notes and the number of suspect notes, the display-or-not-display setting unit 38 sets the display operation such that only the serial number of the abnormally transported genuine note is displayed on the operation and display unit 22, and that the serial number of the counterfeit note or the suspect note is not displayed on the operation and display unit 22. Thus, since the operator can observe the serial number of the abnormally transported genuine note the number of which is relatively small among the plurality of banknotes sent to the reject unit 18, the operator can pick out the abnormally transported genuine note and can put it again to the inlet unit 12. In this case, the remaining banknote is regarded as the counterfeit note or the suspect note.

As described above, according to the banknote handling apparatus 10 in this embodiment, the recognition unit 14 is configured to obtain banknote recognition information by recognizing a banknote, and to acquire an image of the banknote so as to obtain a serial number of the banknote from the acquired banknote image, and the control unit 30 is configured to output display information about the information of the serial number of each banknote which has been sent to the reject unit 18. In addition, the operation and display unit 22 of the banknote handling apparatus 10 is configured to display the display information output by the control unit 30. Thus, since an operator can observe, as to a plurality of banknotes which have been sent to the reject unit 18, a serial number of each banknote, the operator can easily sort a genuine note (specifically, a genuine note which has been sent to the reject unit 18 by abnormal transport) from a counterfeit note or a suspect note, which are mixed in the reject unit 18. Therefore, the operator can more rapidly and easily put the genuine note, which has been sent to the reject unit 18, into the inlet unit 12, whereby the genuine note can be handled again by the banknote handling apparatus 10. On the other hand, as to a counterfeit note or a suspect note, which has been sent to the reject unit 18, the counterfeit note or the suspect note can be easily identified by observing the serial number of the banknote.

In addition, in the banknote handling apparatus 10 in this embodiment, as to the respective banknotes sent to the reject unit 18, the control unit 30 is configured to further output the display information about the recognition information by the recognition unit 14, specifically, information such as a denomination, an authenticity, a fitness and so on of each banknote, and the operation and display unit 22 of the banknote handling apparatus 10 is configured to display the display information output by the control unit 30. Thus, as to the banknotes sent to the reject unit 18, an operator can easily and reliably confirm an authenticity and a fitness of each banknote.

In addition, the control unit 30 is provided with the display-order setting unit 34 configured to set a display order on the display information about the serial numbers of the respective banknotes sent to the reject unit 18. The display-order setting unit 34 is configured to set an order of the serial numbers of the respective banknotes to be displayed, such that the serial numbers are displayed in an order in which the banknotes have been sent and stacked in the reject unit 18, or that the serial numbers are displayed in an order reverse to the order in which the banknotes have been sent and stacked in the reject unit 18. Due to the display-order setting unit 34, based on the stacked condition of the banknotes in the reject unit 18, an order of the serial numbers of the respective banknotes to be displayed can be set such that an operator can easily observe the serial numbers.

In addition, the control unit 30 is provided with the display-color setting unit 36 configured to set a display color relative to the display information about the serial numbers of the respective banknotes sent to the reject unit 18. The display-color setting unit 36 is configured to set, for each serial number, display colors of the serial numbers of respective banknotes, based on the recognition information by the recognition unit 14 (denomination, authenticity, fitness and so on of a banknote). Thus, since a display color relative to a serial number of a banknote can be differentiated for each type of the banknote, i.e., a counterfeit note, a suspect note, an unfit note, an abnormally transported genuine note and so on, confirmation by an operator can be facilitated.

In addition, the control unit 30 is provided with the display-or-not-display setting unit 38 configured to set, as to the display information about the serial numbers of the respective banknotes sent to the reject unit 18, a type of serial number of the banknote to be displayed, out of the various types of banknotes sent to the reject unit 18. The display-or-not-display setting unit 38 is configured to set which serial number of the banknote is to be displayed, out of the respective banknotes sent to the reject unit 18, based on the recognition information by the recognition unit 14. Thus, when only a counterfeit note or a suspect note is desired to be picked up from the plurality of banknotes sent to the reject unit 18, only a serial numbers of a counterfeit note or a suspect note can be displayed.

The control unit 30 may detect, as to the respective banknotes sent to the reject unit 18, the number of each type, and the display-or-not-display setting unit 38 may automatically set which serial number of the banknote is to be displayed, out of the banknotes of various types sent to the reject unit 18, based on the number of banknotes for each type which has been detected by the control unit 30. For example, the display-or-not-display setting unit 38 may automatically set the display operation such that only a serial number of a banknote of a type whose number is the smallest, out of the plurality of banknotes sent to the reject unit 18.

The banknote handling apparatus 10 in this embodiment is not limited to the above example, and can be variously modified.

For example, the display information about the serial numbers of the banknotes output from the control unit 30 may be transmitted to the external apparatus 40 through the interface unit 39, and may be displayed on a display unit (not shown) such as a monitor disposed on the external apparatus 40, instead of being displayed on the operation and display unit 22. In this case, as to the plurality of banknotes sent to the reject unit 18, the operator can see the serial numbers of the respective banknotes displayed on the display unit of the external apparatus 40. Thus, the operator can easily sort a genuine note (specifically, a genuine note which has been sent to the reject unit 18 by abnormal transport), from a counterfeit note or a suspect note, which are mixed in the reject unit 18.

In addition, the banknote image itself obtained by the recognition unit 14 may be transmitted to the control unit 30, and the banknote image may be stored in the memory unit 32 or transmitted to the external apparatus 40 through the interface unit 39. At this time, the banknote image may be stored in the external apparatus 40. In this case, the banknote image, the recognition information and the serial number of the banknote are related to each other and stored in the memory unit 32, or are transmitted to the external apparatus 40. The banknote image, which has been stored in the memory unit 32 or transmitted to the external apparatus 40, can be displayed, together with the recognition information and the serial number of the banknote, on the operation and display unit 22 or on the display unit of the external apparatus 40. Thus, the operator can more reliably sort the respective banknotes sent to the reject unit 18.

The paper-sheet handling apparatus of the present invention is not limited to the banknote handling apparatus for handling a banknote. As the paper-sheet handling apparatus of the present invention, a check handling apparatus for handling a check, in place of a banknote, may be used. In this case, a recognition unit of the check handling apparatus is configured to acquire an image of at least one surface (a surface on one side or surfaces on both sides) of a check, and to obtain at least one that is selected from the group consisting of a bank code, an account number, a serial number, a paid sum, a sign, endorsement information and so on, from the acquired check image. A control unit outputs display information about at least one that is selected from the group consisting of a bank code, an account number, a serial number, a paid sum, a sign, endorsement information and so on, of each check sent to a reject unit. The display information output from the control unit is displayed on a display unit disposed on the check handling apparatus, or transmitted to an external apparatus, such as a higher-level apparatus that is connected, for communication, to the check handling apparatus, so as to be displayed on a display unit disposed on the external apparatus.

In addition, as the paper-sheet handling apparatus of the present invention, a document handling apparatus for handling a document such as a funds-transfer document. In this case, a recognition unit of the document handling apparatus is configured to acquire an image of at least one surface (a surface on one side or surfaces on both sides) of a document, and to obtain at least one that is selected from the group consisting of an item, the number, a unit price and a total sum, from the acquired document image. A control unit outputs display information about at least one that is selected from the group consisting of an item, the number, a unit price and a total sum, of each document sent to a reject unit. The display information output from the control unit is displayed on a display unit disposed on the document handling apparatus, or transmitted to an external apparatus, such as a higher-level apparatus that is connected, for communication, to the document handling apparatus, so as to be displayed on a display unit disposed on the external apparatus.

The invention claimed is:

1. A paper-sheet handling apparatus comprising:

a recognition unit configured to obtain recognition information of a paper sheet and an image of the paper sheet to obtain paper-sheet information;

a stacking unit to which a paper sheet is sent, the paper sheet having been recognized as a normal paper sheet based on the recognition information;

a reject unit to which a paper sheet is sent, the paper sheet being other than the paper sheet that has been recognized as a paper sheet to be sent to the stacking unit based on the recognition information; wherein the paper sheet may be at least a suspect note or a genuine note, and a control unit configured to output display information including the paper-sheet information of each paper sheet sent to the reject unit, the display information being displayed in different manners for a case in which the paper sheet sent to the reject unit is a suspect sheet and for another case in which the paper sheet sent to the reject unit is a genuine sheet, wherein the paper-sheet information is a serial number.

2. The paper-sheet handling apparatus according to claim 1, wherein the display information is displayed in different manners for a case in which the paper sheet sent to the reject unit is an unfit genuine sheet and for another case in which the paper sheet sent to the reject unit is an abnormally transported genuine sheet.

3. The paper-sheet handling apparatus according to claim 1, wherein the display information is displayed at least partly in different colors based on the recognition information of each paper sheet.

4. The paper-sheet handling apparatus according to claim 1, wherein at least a part of the display information is not displayed based on the recognition information of each paper sheet.

5. The paper-sheet handling apparatus according to claim 1, wherein the display information is displayed in different manners based on the numbers of respective types of the paper sheets, based on the recognition information of each paper sheet.

* * * * *